(12) United States Patent
Salter et al.

(10) Patent No.: US 10,821,937 B1
(45) Date of Patent: Nov. 3, 2020

(54) ACTIVE APPROACH DETECTION WITH MACRO CAPACITIVE SENSING

(71) Applicant: Ford Global Technologies, LLC, Dearborn, MI (US)

(72) Inventors: Stuart C. Salter, White Lake, MI (US); Pietro Buttolo, Dearborn Heights, MI (US); John Robert Van Wiemeersch, Novi, MI (US); Paul Kenneth Dellock, Northville, MI (US); Ali Hassani, Ann Arbor, MI (US); Ryan Edwin Hanson, Livonia, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 0 days.

(21) Appl. No.: 16/752,603

(22) Filed: Jan. 24, 2020

(51) Int. Cl.
| | |
|---|---|
| *B60R 25/24* | (2013.01) |
| *B60R 25/30* | (2013.01) |
| *B60R 25/04* | (2013.01) |
| *B60R 25/10* | (2013.01) |
| *B60R 25/102* | (2013.01) |

(52) U.S. Cl.
CPC ............ *B60R 25/241* (2013.01); *B60R 25/04* (2013.01); *B60R 25/102* (2013.01); *B60R 25/1012* (2013.01); *B60R 25/305* (2013.01)

(58) Field of Classification Search
CPC ... B60R 25/241; B60R 25/102; B60R 25/305; B60R 25/1012; B60R 25/04
See application file for complete search history.

(56) References Cited

U.S. PATENT DOCUMENTS

| | | | | |
|---|---|---|---|---|
| 2010/0090817 | A1* | 4/2010 | Yamaguchi | B60R 25/04 340/438 |
| 2012/0280788 | A1* | 11/2012 | Nowottnick | H04L 9/3271 340/5.61 |
| 2017/0200335 | A1* | 7/2017 | Da Deppo | G07C 9/00309 |

* cited by examiner

Primary Examiner — Thomas S McCormack
(74) Attorney, Agent, or Firm — Frank Lollo; Eversheds Sutherland (US) LLP (57) ABSTRACT

The disclosure is directed to a vehicle capacitive sensor system configured to detect activity, such as a person approaching the vehicle, from a distance from the vehicle (e.g., 5 meters, 10 meters, etc.). The system may initiate various levels of wakeup procedures based on a predicted user intention for use of the vehicle, and may utilize a Phone-as-a-Key (PaaK) system or key fobs in addition to the capacitive field sensors. The system may reduce or eliminate lag time associated with vehicle wakeup operations by enabling features, such as a Passive Entry Passive Start (PEPS) system, in advance of the person making physical contact with a vehicle trigger point. The disclosure includes capacitive sensors integrated with vehicle body panels and moldings, such that vehicle surfaces, either alone or in groups, can function as macro capacitive sensors for detecting various metrics associated with changing capacitive fields.

20 Claims, 4 Drawing Sheets

ACTIVE APPROACH DETECTION WITH MACRO CAPACITIVE SENSING

TECHNICAL FIELD

The present disclosure relates to capacitive proximity sensor systems for automobiles.

BACKGROUND

Vehicles with an open cargo bed area, such as pickup trucks, are often used to carry cargo in the cargo bed.

Capacitive proximity sensing for vehicles is disclosed in U.S. Pat. No. 6,081,185 (hereafter "the '185 publication"), assigned to Valeo Securite Habitacle, describes a vehicle with a system for detecting the approach of a user using capacitance-variation detectors that detect an increase in capacitance when the user's hand approaches the surface of the vehicle. The '185 publication does not provide features that detect individuals at further distances using macro capacitive sensors integrated in portions of the body and trim of the vehicle. In other aspects, the '185 publication further does not include sensing capability that can determine context of the individual's approach, such as evaluating physical movement and attributing predictive intention to the individual's movement as they approach the vehicle. Moreover, conventional systems do not include power conservation measures that alter the sensor scan rate based on contextual cues and operational metrics.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein describe a vehicle that is configured with a capacitive sensor system configured to detect activity from a distance, such as a person approaching the vehicle, and initiate various levels of wakeup procedures based on a predicted user intention for use of the vehicle. The system may reduce or eliminate lag time associated with vehicle wakeup operations by enabling features, such as a Passive Entry Passive Start (PEPS) system, in advance of the person making physical contact with a vehicle trigger point. For example, in conventional PEPS systems, the vehicle may perform wakeup operations based on a trigger action such as a user touching a door handle in some conventional systems, which can lead to latency issues because the wakeup operations may take more time to unlock than the time it takes a user to grab and pull the door handle which may result in the user pulling on a locked door Therefore, advanced notice of a user's intent to open a locked door can allow the vehicle to complete wakeup operations by the time the user is actively pulling on the door handle.

In an embodiment, the capacitive sensor system may evaluate capacitive field information to interpret and predict an intention of an approaching individual. For example, the capacitive sensor system may receive sensor information from capacitive sensors integrated with the vehicle body and molded parts. The system may identify patterns in the capacitive field to predict a user intention based on contextual cues that are sensed and contextualized by the capacitive sensor processor.

In one aspect, the system may observe capacitive intensity changes as an individual approaches the vehicle, such as by walking around two sides of the vehicle. As the user converges on a door to enter the vehicle, the system may interpret changes in the capacitive intensity to formulate a prediction of user intent, based on the user position, walking path, walking pace, etc., by determining that the user intends to enter the vehicle.

In other aspects, the capacitive sensor system may combine historical use data and mobile device data to form predictions, and to allow the user to access the vehicle through the PEPS system using Phone-as-a-Key (PaaK) systems in combination with the capacitive sensor system 107. For example, the PaaK system associated with the vehicle 105 may associate a mobile device or other smart device configured to send and receive Bluetooth® Low-Energy (BLE) signals with the vehicle 105 control system to provide access to the vehicle as a user approaches the vehicle. For example, the PaaK system may wake the vehicle as a user advances with an enabled PaaK device responsive to determining that the user is approaching the vehicle (using the capacitive sensor system described herein). In other aspects, the PaaK system may provide a source of data input to determine time information, date information, identity information, etc., that can provide an additional security layer such that a user is identified as an authorized user, and that particular user's habit for vehicle use is known and stored as data in the remote server(s) associated with vehicle wireless network(s) and/or vehicle computer memory.

With respect to the macro capacitive sensing (MCS) sensor functionality, the sensor scan rate (time between scans) may be sped up to increase accuracy when a change is detected in the capacitive intensity detected by the various sensors. The scan rate may also be slowed down when the vehicle is parked to extend the available battery energy supplying power for the feature. The feature may shut off if the battery state of charge falls below a given threshold (e.g., 40%). The trigger radius may also be adjustable by a user or the vehicle depending on the situation. Additionally, once the initial trigger radius is reached based on the capacitive sensors, other vehicle sensors may be activated to allow more refined decision making (camera image assessment, LIDAR ultrasonic sensing, etc.).

Aspects of the present disclosure can reduce or eliminate lag associated with vehicle wakeup operations using capacitive sensors disposed on exterior portions of the vehicle. Moreover, when the vehicle is parked for an extended duration, aspects of the present disclosure may extend battery life by modifying scan rate and/or the duration of a scan with the capacitive sensors, and may shut off automatically when vehicle power sources fall below a threshold level of power.

These and other advantages of the present disclosure are provided in greater detail herein.

ILLUSTRATIVE EMBODIMENTS

The disclosure will be described more fully hereinafter with reference to the accompanying drawings, in which exemplary embodiments of the disclosure are shown, and not intended to be limiting.

Figure 1:
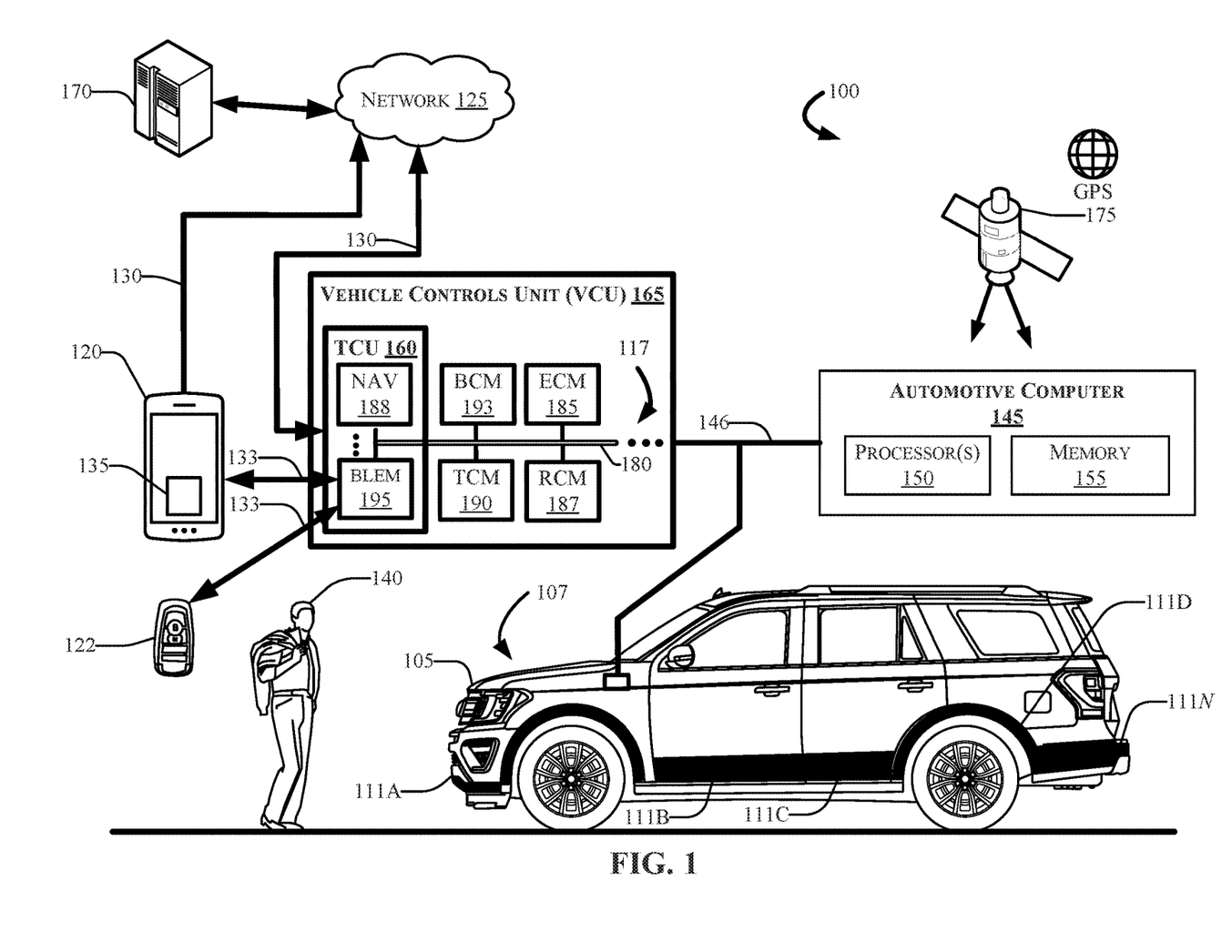
FIG. 1 depicts an example computing environment in which techniques and structures for providing the systems and methods disclosed herein may be implemented.

FIG. 1 depicts an example computing environment 100 that can include a vehicle 105, an automotive computer 145, a Vehicle Controls Unit (VCU) 165 disposed in connection with the automotive computer 145 by way of a power bus 146, and a mobile device 120. The mobile device 120 may be communicatively coupled with the vehicle 105 via one or more network(s) 125, and via one or more direct connection(s) which may communicate via one or more wireless channel(s) 130, via the network(s) 125, and/or via wireless channel(s) 133 that connect the mobile device 120 to the vehicle 105 directly via the VCU 165.

The mobile device 120 may include one or more application(s) 135. The mobile device 120 generally includes a memory (not shown in FIG. 1) for storing program instructions associated with an application 135 that, when executed by a mobile device processor (not shown in FIG. 1), performs aspects of disclosed embodiments. The application (or "app") 135 may be part of the capacitive sensor system 107, or may provide information to the capacitive sensor system 107 and/or receive information from the capacitive sensor system 107.

The automotive computer 145, may include one or more processor(s) 150 and memory 155. The VCU 165 may be disposed in communication with and/or be a part of the automotive computer 145. The VCU 165 may be disposed in communication with the mobile device 120 via the wireless channel(s) 130 and/or 133, with one or more server(s) 170 via the wireless channel(s) 130, and/or with a key fob 122 via the wireless channel(s) 133. The server(s) 170 may be associated with and/or include a Telematics Service Delivery Network (SDN), and may provide vehicle control access to the user 140, the key fob 122, and/or the mobile device 120 (which may, in some embodiments, also be enabled as and/or include a PEPS vehicle key). The vehicle 105 may also receive and/or be in communication with a Global Positioning System (GPS) 175.

Embodiments of the present disclosure provide a capacitive sensor system 107 for monitoring a vehicle use intent for the vehicle 105 using one or more capacitive fields 112. Although illustrated as a sport utility, the vehicle 105 may take the form of another passenger or commercial automobile such as, for example, a car, a truck, a sport utility, a crossover vehicle, a van, a minivan, a taxi, a bus, etc., and may be configured to include various types of automotive drive systems.

Exemplary drive systems can include various types of internal combustion engine (ICE) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in HEV (PHEV) that includes an HEV powertrain connectable to an external power source, and including a parallel or series hybrid powertrain having a combustion engine powerplant and one or more EV drive systems. HEVs can include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5. An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and does not include human operational driving controls.

A plurality of capacitive proximity sensors 111A, 111B, 111C, 111D . . . 111N (collectively referred to hereafter as "capacitive proximity sensor bank 111") shown in FIG. 1 is depicted on surfaces of the vehicle 105. It should be appreciated that the capacitive proximity sensors 111 may be rigidly disposed on any external or internal surface of the vehicle 105. Moreover, although depicted as a plurality of capacitive sensors, the capacitive proximity sensor 111 may embody a single sensor, or may include a plurality of capacitive sensors that work in conjunction with one another as part of a capacitive sensor bank. The proximity sensors 111 may be disposed on or integrated with any number of vehicle 105 surfaces. One feature of the capacitive sensors 111 includes the versatility of the capacitive bodies of the sensors. In one embodiment, a front grill sensor 111A located proximate the bumper (also referred to herein as a bumper capacitor) may include a conductive primer covering on an exterior surface of a vehicle portion proximate the front grill and bumper (e.g., the front grill sensor 111A) and be electrically connected via one or more control channels 113 that can connect the automotive computer 145 to the VCU 165 and the capacitive sensor bank 111.

According to an example embodiment, the capacitive sensor system 107 may communicate with the mobile device 120 via the one or more wireless channel(s) 130. The mobile device 120 includes application 135, which may be controllable by a user 140 as described in various embodiments.

The network(s) 125 and wireless channel(s) 130 and 133 illustrate one example communication infrastructure in which the connected devices discussed in various embodiments of this disclosure may communicate. In some aspects, the mobile device 120 may communicate with the vehicle 105 through the one or more wireless channel(s) 130 and/or 133, which may be encrypted and established between the mobile device 120 and a Telematics Control Unit (TCU) 160 that may be operative as part of the VCU 165. The mobile device 120 may communicate with the VCU 165 using the TCU 160, which can include, for example, a Bluetooth® Low-Energy (BLE) Module (BLEM) 195. The BLEM 195 may communicate with the mobile device 120 using a wireless communication network such as, for example, the one or more network(s) 125, and/or via the wireless channel(s) 133 that directly connect the vehicle 105 to enabled devices.

The network(s) 125 may be and/or include the Internet, a private network, public network or other configuration that operates using any one or more known communication protocols such as, for example, transmission control protocol/Internet protocol (TCP/IP), Wi-Fi (based on the Institute of Electrical and Electronics Engineers (IEEE) standard 802.11), Ultra-Wide Band (UWB), and/or cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples. The wireless channel(s) 130 and/or 133 may include data connectivity using various low-energy protocols including, for example, Bluetooth®, or Near Field Communication (NFC) protocols.

The automotive computer 145 may be installed in an engine compartment of the vehicle 105 (or elsewhere in the vehicle 105) and operate as a functional part of the capacitive sensor system 107, in accordance with the disclosure. The automotive computer 145 may include one or more processor(s) 150 and a computer-readable memory 155.

The one or more processor(s) 150 may be disposed in communication with one or more memory devices (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing program code. The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may coordinate the data between vehicle 105 systems (e.g., the ECUs 117), connected servers (e.g., the server(s) 170), the automotive computer 145, and other vehicles (not shown in FIG. 1) operating as part of a vehicle fleet (not shown in FIG. 1). The VCU 165 can include or communicate with any combination of the ECUs 117, such as, for example, a Body Control Module (BCM) 193, an Engine Control Module (ECM) 185, a Transmission Control Module (TCM) 190, the TCU 160, a Restraint Control Module (RCM) 187, etc. In some aspects, the VCU 165 may control aspects of the vehicle 105, and implement one or more instruction sets received from the application 135 operating on the mobile device 120, from one or more instruction sets received from the capacitive sensor system 107, and/or from instructions received from an autonomous vehicle (AV) controller (not shown in FIG. 1).

The TCU 160 can be configured to provide vehicle connectivity to wireless computing systems onboard and offboard the vehicle 105, and may include a Navigation (NAV) receiver 188 for receiving and processing a GPS signal from the GPS 175, the BLEM 195, a Wi-Fi transceiver, an Ultra-Wide Band (UWB) transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180.

The BLEM 195 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120, and/or one or more keys (which may include, for example, the key fob 122).

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the capacitive sensor system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance.

The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. In an example embodiment, the ECUs 117 may control aspects of vehicle operation and communication using inputs from human drivers, inputs from an autonomous vehicle controller (not shown in FIG. 1), the capacitive sensor system 107, and/or via wireless signal inputs received via the wireless channel(s) 133 from other connected devices such as the mobile device 120, among others. The ECUs 117, when configured as CAN nodes in the bus 180, may include a central processing unit (CPU), a CAN controller, and/or a transceiver (not shown in FIG. 1). For example, although the mobile device 120 is depicted in FIG. 1 as connecting to the vehicle 105 via the BLEM 195, it is contemplated that the wireless channel(s) 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The central BCM 193 may also operate as a gateway for bus and network interfaces to interact with remote ECUs (not shown in FIG. 1).

Figure 2:
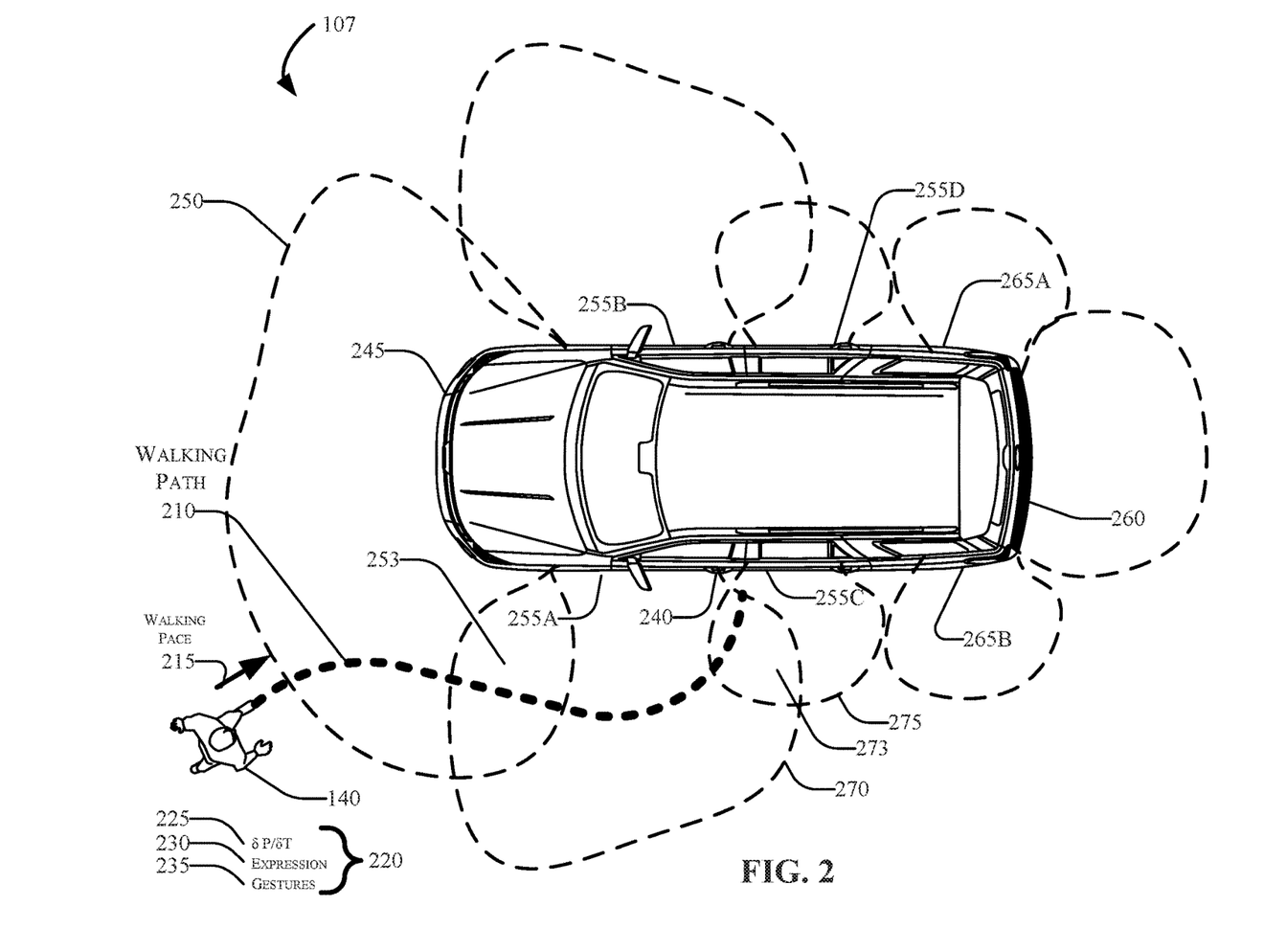
FIG. 2 depicts a plan view of a person approaching an example vehicle and capacitive sensor system for use in accordance with the present disclosure.

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality. In one aspect, a vehicle having a trailer control system may integrate the system using, at least in part, the BCM 193. The capacitive proximity sensor 111 may be one sensor of a capacitive proximity sensor bank. One example of such a sensor bank is depicted in FIG. 2 as a capacitive proximity sensor bank (not shown in FIG. 1 or 2).

In an example embodiment of the present disclosure, the BCM 193 is disposed in communication with the capacitive proximity sensor bank 228, and configured to access one or more of the ECUs 117 and provide information to the automotive computer 145 as part of disclosed computing logic described herein. For example, the automotive computer 145 may work in conjunction with the BCM 193 (and with other ECUs 117) to determine vehicle drive states, select capacitive field sample rates, determine changes in the capacitive field associated with the cargo bed 106 of the vehicle 105, and determine positional changes of cargo in the cargo bed. The capacitive proximity sensors 111A-111N may be part of a capacitive proximity sensor bank (collectively "sensors 111"). The sensors 111 may include, for example, a front grill sensor 111A, a front driver-side door 111B, a rear driver-side door sensor 111C, one or more wheel well sensors 111D, etc.

In an example embodiment of the present disclosure, the BCM 193 is disposed in communication with the capacitive proximity sensors 111, and configured to access one or more of the ECUs 117 and provide information to the automotive computer 145 as part of disclosed computing logic described herein. For example, the automotive computer 145 may work in conjunction with the BCM 193 (and with other ECUs 117) to determine vehicle drive states, select capacitive field rates, determine changes in the capacitive field associated with the vehicle 105, and determine positional changes of individuals or objects approaching the vehicle 105.

The ECUs 117 are described for exemplary purposes only, and are not intended to be limiting or exclusive. Control and/or communication with other control modules not shown in FIG. 1 is possible, and such control is contemplated.

The automotive computer 145 may include one or more processor(s) 150 and a computer-readable memory 155. The automotive computer 145 may be installed in an engine compartment of the vehicle 105 (or elsewhere in the vehicle 105) as part of the capacitive sensor system 107, in accordance with the disclosure. The automotive computer 145 may include, in one example, the one or more processor(s) 150, and a computer-readable memory 155. In other example embodiments, the VCU 165 may be integrated with and/or be incorporated with the automotive computer 145. The computing system architecture of the automotive computer 145 may omit certain computing modules. It should be readily understood that the computing environment depicted in FIG. 1 is one example of a possible implementation according to the present disclosure, and thus, it should not to be considered limiting or exclusive.

The one or more processor(s) 150 may be disposed in communication with one or more memory devices (e.g., the memory 155 and/or one or more external databases (not shown in FIG. 1). The one or more processor(s) 150 may utilize the memory 155 to store programs in code and/or to store data for performing computer logic and control steps in accordance with the disclosure. The memory 155 may be a non-transitory computer-readable memory. The processor(s) 150 may be configured to execute computer-executable instructions stored in the memory 155 for performing various functions of the capacitive sensor system 107, as well as for performing vehicle control capabilities in accordance with the disclosure. Consequently, the memory 155 may be used for storing code and/or data code and/or data for performing operations in accordance with the disclosure.

In one example embodiment, the memory 155 may store information such as, for example, particular vehicle states that can indicate that a person approaching the vehicle 105 intends (or is predicted to) use the vehicle 105 in a particular way. The system 107 may evaluate information received from the sensor(s) 111, including, for example, a static field (also referred to herein as "a capacitive field") emanating from a vehicle body portion that has been coated with a capacitive primer, or contains an insert molded capacitive electrode or capacitive film. The memory 155 may store information in the form of a lookup table or other database.

The ECUs 117 described with respect to the VCU 165 are provided for exemplary purposes only, and are not intended to be limiting or exclusive. Control and/or communication with other control modules not shown in FIG. 1 is possible, and such control is contemplated.

With respect to the computing architecture of the memory module(s), the memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc. The memory 155 may be one example of a non-transitory computer-readable medium, and may be used to store programs in code and/or to store data for performing various operations in accordance with the disclosure. The instructions in the memory 155 can include one or more separate programs, each of which can include an ordered listing of computer-executable instructions for implementing logical functions. Example logical functions are discussed with respect to FIGS. 10 and 11.

FIG. 2 depicts a plan view of an example embodiment, in accordance with the present disclosure. In one aspect, a person (e.g., the user 140) may approach the vehicle 105 configured with the capacitive sensor system 107 in various ways, where the approach (e.g., walking path 210, walking or running pace 215, etc.), and other exhibited cues 220 (e.g., difference in walking pace with respect to time 225 (e.g., an acceleration value), facial expression 230, hand or body gestures 235, among other possible information) can provide cues and indications of an intended use for the vehicle 105.

For example, the user 140 is depicted in FIG. 2 walking at the walking pace 215 without any rushing or sudden changes in motion (exhibited by the difference in pace with respect to time 225). In one aspect, the system 107 may determine that the user 140 likely intends to enter the vehicle 105, because the walking path 210 is likely leading to the driver-side door 240 of the vehicle 105. In other aspects, the system 107 may determine that the user 140 exhibits mannerisms normally exhibited by this particular individual based on prior observations of how the user 140 approaches the vehicle 105 when he is about to enter the driver side door 240 and execute a key-on operation. In another aspect, the system 107 may determine the user's 140 intended use for the vehicle 105 based on behavior data associated with a group of similarly situated vehicle users (not shown in FIG. 2).

The system 107 may include a plurality of vehicle sensors that can include, for example, a front grill capacitive sensor 245 that may generate a capacitive field 250 that extends around a front area of the vehicle 105, a plurality of capacitive door panel sensors 255A, 255B, 255C, and 255D, respectively, that generate capacitive fields (shown as dashed lines extending from respective door locations), a rear-gate sensor 260, and rear quarter panel sensors 265A and 265B. Any number of capacitive sensors are possible, and limited only by the power constraints, desired number of data points, and use factors that may change based on various vehicle uses. It should be appreciated, therefore, that the depicted configuration of capacitive sensors in the example of FIG. 2 is not intended to be limiting. Other configurations of sensors are possible, and such configurations are contemplated.

The system 107 may determine the intended vehicle use by predicting a future user action. The prediction is based, at least in part, on detected changes in capacitive fields generated and observed by the capacitive sensor system 107. This input may be exclusive to, or in addition to the information discussed above with respect to the walking pace 215, the change of walking pace 225 and/or other exhibited cues 220. For example, the user 140 is depicted in FIG. 2 as walking along the walking path 210. The observed walking path 210 enters the capacitive field 250 associated with the front grill capacitive sensor 245, into a convergence area 253 that includes two converging capacitive fields 250 and 270, respectively generated by sensors 245 and 255A. The user 140 may then enter into a second convergence of capacitive fields 273 that includes a combination of the capacitive field 270 and a capacitive field 275 generated by the rear driver side door sensor 255C. Accordingly, the system 107 may sample time-delineated values for the capacitive fields to determine respective values of capacitance with respect to time.

In some aspects, it may be advantageous to sample the respective fields at a predetermined sample rate that is relatively slow (e.g., every two seconds, every 5 seconds, etc.) to conserve battery resources at times that the vehicle is parked or stopped for extended periods. In an example embodiment, as the user 140 proceeds along the walking path, the system 107 may select a capacitive field scan rate for one or more of the capacitive sensors based on the vehicle drive state. For example, if the drive state is park, a first scan rate may be selected. When the drive state is indicative that the vehicle is in park, the system 107 may slow down the scan rate to a predetermined rate (e.g., 6 samples and scans every 20 mS), and extend the scan time out for the time between scan to be 2 seconds. With this setting, for example, the system may have the effect of using 1/600 of the power of a relatively faster scan rate.

In another aspect, a relatively faster scan rate may include taking 64 capacitive field samples every 20 mS, which may achieve a relatively faster response while recognizing various types of motions within 100 mS. Even though the power usage may be minimal, a higher power setting may not be needed to accomplish speed and accuracy for perimeter sensing when there is no activity around the vehicle 105.

As another example, in an operative drive state (e.g., stopped at a traffic light) the system 107 may select another scan rate to accommodate additional activity proximate the vehicle 105, where a faster sample rate can actively detect moving objects and people.

In another aspect, particular sensors may remain at a first (relatively slower) scan rate, while sensors associated with the walking path 210 are enabled by the system 107 to generate a relatively faster scan rate as compared to the first rate. This feature may have the effect of conserving battery power until particular sensors identify areas of the vehicle requiring faster sample rates. For example, the system 107 may enable only contiguous sensors with a faster scan rate as compared to the first scan rate at which all sensors may operate absent that activity.

In another aspect, the processor(s) 150 may select a capacitive field scan rate based on a vehicle power state, such as an indication of an amount of remaining battery charge. In one aspect, the system 107 may disable the capacitive sensors when the remaining battery power reaches a threshold value (e.g., 40% of power).

According to some aspects of the present disclosure, a capacitive field may be changeable by the presence of objects due to disturbance to the respective capacitive field, which may be due to a relative dielectric constant of an object. For example, objects such as a shovel, extension cord, etc., are many times left leaning up or hanging over the side of a vehicle temporarily, and can be forgotten when driving off. In such events, the system 107 may detect when an object is left on the vehicle 105, such as a length of rope or wire hanging off the edge of a cargo bed of a truck that is enabled with the capacitive sensor system 107. When an object is left touching a sensor, such as a shovel or rake handle, for example, the system 107 may detect that object even if the object is non-conductive. Although a conductive object may be relatively easier to detect by the system 107 due to the higher dielectric constant, other aspects such as the size of the object, etc., may change the capacitance field which exponentially increases as the distance between the object and the vehicle 105 decreases.

In other aspects, the system 107 may include an adjustable trigger level that allows a user to select a trigger distance (e.g., a first setting may set the trigger distance to be between 6-8 ft or less, a second distance setting may include a second trigger distance of 8-15 feet to touching the vehicle, etc.). Other settings are possible and contemplated. In another aspect, the system may include a default trigger level (e.g., 3 feet) where a tight parking space with small distances between parked vehicles does not trigger the capacitive sensor system 107 with repeating false alarms. The system 107 may execute one or more mitigating actions responsive to a trigger. For example, a mitigating vehicle action may include generating a control signal that enables a vehicle function or disables a vehicle function. The system may sound an alarm, trigger an image sensor (not shown in FIG. 2) to obtain an image of a person and/or object, generate an instruction for disabling a vehicle function via the VCU 165, and/or transmit an alarm message to the mobile device 120 and/or the server(s) 170. Other mitigating actions are contemplated.

Figure 3:
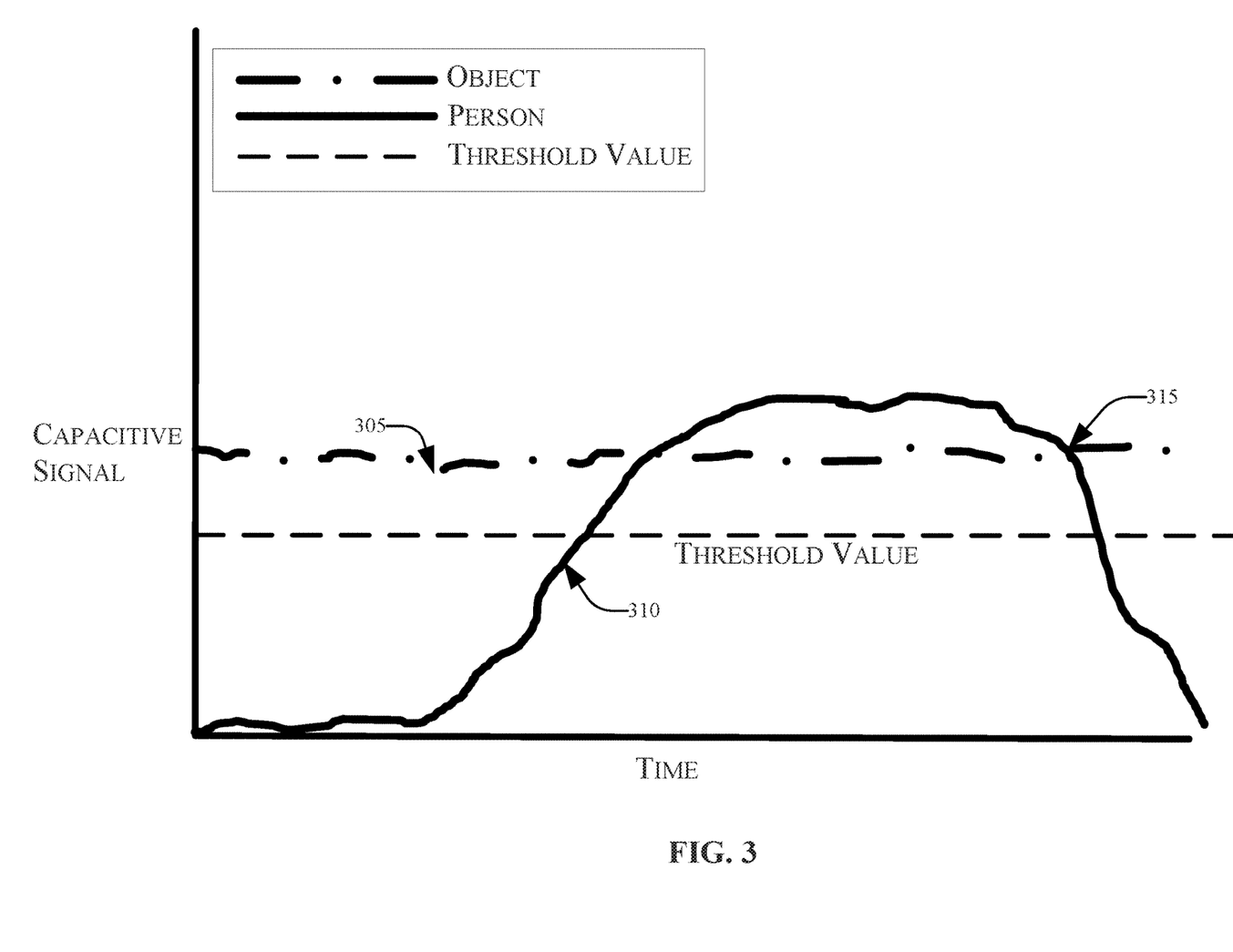
FIG. 3 is a graph of capacitance signals with respect to time in accordance with the present disclosure.

FIG. 3 is a graph of capacitance signals with respect to time in accordance with the present disclosure. The capacitive sensor system 107 may trigger any one or more of the mitigating actions based on capacitance of a respective capacitive field. As demonstrated in the graph of FIG. 3, the capacitive signal may vary depending on whether the object is a thing or a person. Accordingly, the system may observe the capacitive signal to determine one or more patterns in the rise or fall of the signal, such that the pattern may be indicative of human intents and actions. For example, a pattern may be associated with vehicle tampering (e.g., a pattern 305), or associated with a forgotten object (310), or a person running away from the vehicle (315). Other interpretations are possible and contemplated. Accordingly, the present disclosure does not include an exhaustive list of such interpretations, and should not be considered limiting.

Figure 4:
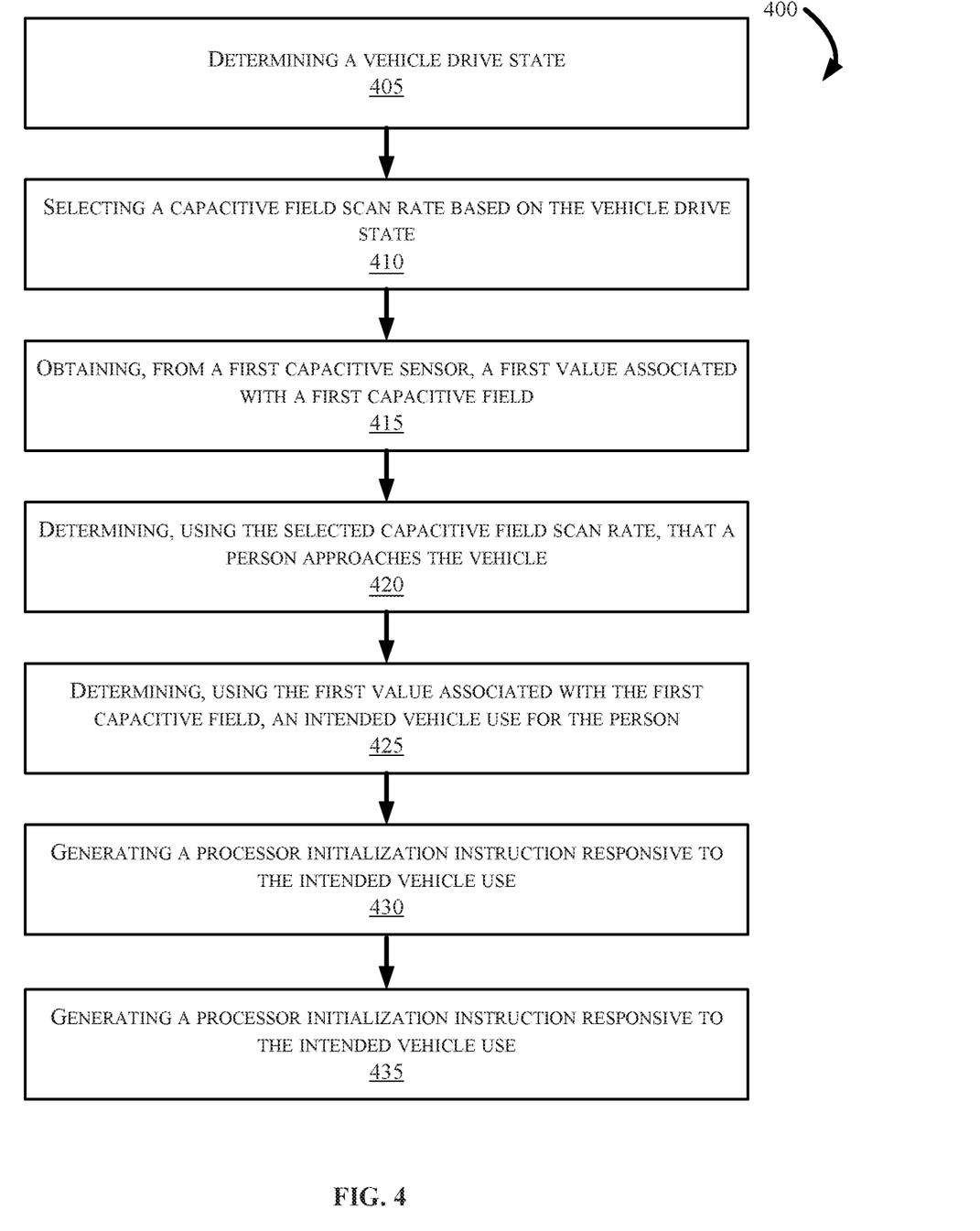
FIG. 4 depicts a flow diagram in accordance with the present disclosure.

FIG. 4 is a flow diagram of an example method 400 for monitoring activity near a vehicle, according to the present disclosure. FIG. 4 may be described with continued reference to prior figures, including FIGS. 1-3. The following process is exemplary and not confined to the steps described hereafter. Moreover, alternative embodiments may include more or less steps than are shown or described herein, and may include these steps in a different order than the order described in the following example embodiments.

Referring first to FIG. 4, at step 405, the method 400 may commence with determining a vehicle drive state. Examples of various vehicle drive states can include a vehicle in park, drive, neutral, low gear, etc. In other aspects, the drive state of a vehicle may be park, where the vehicle engine and components are powered off. The drive mode may also include any combination of information associated with a vehicle speed, a turn radius, an acceleration rate, a severity of braking action, vehicle inertial information, ambient temperature, road conditions, weather conditions, and/or other information associated with operation of the vehicle 105. In other aspects, the drive mode may include information associated with vehicle location (e.g., one or more GPS coordinates), or other vehicle drive information.

Next, the method includes a step 410 of selecting a capacitive field scan rate based on the vehicle drive state. In one aspect, the processor(s) 150 may cause the BCM 193 or another of the ECUs 117 configured to control scan rate for capacitive proximity sensor(s) 111, to set the capacitive sensor scan rate of the sensor(s) 111 as a function of vehicle speed.

At step 415, the method includes a step of obtaining, from a first capacitive sensor, a first value associated with a first capacitive field. In one aspect, the processor(s) 150 may evaluate changes in capacitive fields associated with the capacitive proximity sensors. For example, determining the change of the capacitive field(s) can include receiving, from the capacitive proximity sensors disposed on the vehicle, a capacitance value that may be, for example, an input voltage or a Fast Fourier Transform (FFT) value associated with the capacitive field. Other metrics associated with capacitive sensors are possible, and such metrics are contemplated. The processor(s) 150 may receive, from the capacitive proximity sensors 111, a second capacitance value for the capacitance field(s), and determine, based on the first capacitance value and the second capacitance value, that a person approaching the vehicle 105 has changed position with respect to the vehicle. Accordingly, the determination is made by comparing the first and the second capacitance values to determine if a threshold change of values has been met.

Accordingly, at step 420, the method includes a step of determining, based on the first value associated with the first capacitive field that a person approaches the vehicle. The system 107 may determine the person's approach in various ways.

At step 425, the method includes a step of determining, using the first value associated with the first capacitive field, an intended vehicle use for the person. In some aspects, the processor(s) 150 may determine the intended use (that is, predict such use based on patterns of observed human behavior). One method of making such a determination can include using a key fob (e.g., the key fob 122 as shown in FIG. 1) or a PaaK device such as the mobile device 120 as a secondary source of data input. The system 107 may determine that the key fob 122 is operating conterminously (that is, operating simultaneously at least some of the time) with the capacitive field, and is operating within a threshold distance from the vehicle 105. A threshold distance may be 5 meters, 10 meters, etc. The processor(s) 150 may provide the access to the vehicle 105 based on determining that the key fob 122 has coterminous operation within the threshold distance.

The intended vehicle uses, as described in prior aspects of the present disclosure, may be to enter the vehicle via a particular door, to start the motor of the vehicle, to operate a vehicle control or mechanism, to operate an infotainment feature of the vehicle, to travel to a particular destination using the vehicle, etc. In other aspects, the intended use may be for a disagreeable purpose as well, which may be determinable based on user 140 actions. In another example, the user may run away from the vehicle while having removed something from a cargo area of the vehicle. Other examples are possible and are contemplated.

At step 430, the method includes a step of generating a processor initialization instruction responsive to the intended vehicle use. The instruction may provide that the access to the vehicle 105 can include executing one or more wakeup instructions, and performing other steps. The processor initialization instruction may include one or more instruction sets that prepare vehicle systems to generate outputs that can include, for example, an exterior light or an interior cabin light, and an audible voice message or other audible feedback. The processor initialization instruction may further include actuation or enablement of a vehicle security feature, such as voice recognition, facial recognition, fingerprint recognition, or another biometric vehicle access system. The processor initialization instruction may further include activation of one or more audio/video capture systems that may help to mitigate or avoid theft, vehicle damage, and other harms.

In one example, the processor initialization instruction may include a light activation that lights a path for the approaching user, lights a puddle lamp near the point of entry of the vehicle, and/or activates vehicle cabin lights responsive to detecting an appropriate key fob proximate the vehicle.

In another example, as the user approaches the vehicle, the processor initialization instruction may be configured to cause the processor to initialize a speech recognition engine such that it can receive the user's voice command, identify the user based on speech recognition algorithms, and interpret one or more voice commands from the authenticated user. For example, as the user approaches the vehicle, the processor initialization instruction may cause the voice recognition system (not shown in FIG. 4) to authenticate the approaching user based on voice patterns and other identifying features discernable by the user's voice command, and perform one or more vehicle actions responsive to the voice command. An example action may be opening a motorized door, turning on or off a vehicle cabin light or exterior light, performing a key-on operation, etc.

In yet another example, as the user approaches the vehicle, the processor initialization instruction may be configured to cause the processor to initialize a facial recognition system that accesses one or more video feeds from a vehicle camera, and/or from the user's mobile device, obtains one or more images of the user's face, and authenticates the user using facial minutiae. In another aspect, the processor initialization instruction may be configured to cause the processor to initialize a fingerprint scanner, or another biometric access device.

The processor initialization instruction may be further configured to cause the processor to initialize one or more cameras disposed around the vehicle, such as a 360-degree camera system, with the aim of mitigating loss of property due to theft or vandalism.

Although several non-limiting examples for particular system initializations are described, it should be appreciated that such examples are not exhaustive and can include actuation or preparation for actuation of any number of vehicle systems.

At step 435, the method includes a step of providing access to the vehicle based on the processor initialization instruction. Providing access to the vehicle can include actuation of any of the systems, or other systems, described according to embodiments herein.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation. All terms used in the claims are intended to be given their ordinary meanings as understood by those knowledgeable in the technologies described herein unless an explicit indication to the contrary is made herein.

In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for monitoring activity in a vehicle, comprising:

determining a vehicle drive state;

selecting a capacitive field scan rate based on the vehicle drive state;

obtaining, from a first capacitive sensor, a first value associated with a first capacitive field;

determining, based on the first value associated with the first capacitive field that a person approaches the vehicle;

determining, using the first value associated with the first capacitive field, an intended vehicle use for the person;

generating a processor initialization instruction responsive to the determined intended vehicle use; and providing access to the vehicle based on the processor initialization instruction.

2. The method of claim 1, further comprising:
obtaining, from a second capacitive sensor, a second value associated with a second capacitive field, wherein the second capacitive field intersects the first capacitive field; and
determining the intended vehicle use based on the first value and the second value.

3. The method according to claim 2, further comprising:
determining that a key fob has coterminous operation with the capacitive field within a threshold distance from the vehicle; and
providing the access to the vehicle based on determining that the key fob has coterminous operation with the capacitive field within the threshold distance.

4. The method of claim 3, further comprising:
enabling, via a wakeup signal, a third sensor;
obtaining a third value indicative of the person approaching the vehicle; and
determining the intended vehicle use based on the first value, the second value, and the third value.

5. The method according to claim 3, wherein the key fob is a Phone-as-a-Key (PaaK) device.

6. The method according to claim 1, wherein providing vehicle access comprises:
triggering a mitigating vehicle action comprising one or more of:
sounding an alarm;
triggering an image sensor to obtain an image of the person;
generating an instruction for disabling a vehicle function via an Electronic Control Unit (ECU); and
transmitting a message to a mobile device.

7. The method according to claim 1, wherein determining the intended vehicle use for the person comprises:
determining a movement of the person with respect to time;
determining a trajectory of the movement of the person with respect to the vehicle;
comparing the movement of the person and the trajectory of the person to a table indicative of vehicle usage; and
selecting the intended vehicle use for the person from the table indicative of vehicle usage.

8. A capacitive sensor system for a vehicle, comprising:
a processor; and
a memory for storing executable instructions, the processor configured to execute the instructions to:
determine a vehicle drive state;
select a capacitive field scan rate based on the vehicle drive state;
obtain, from a first capacitive sensor, a first value associated with a first capacitive field;
determine, using the selected capacitive field scan rate, that a person approaches the vehicle;
determine, using the first value associated with the first capacitive field, an intended vehicle use for the person;
generate a processor initialization instruction responsive to the intended vehicle use; and
provide access to the vehicle based on the processor initialization instruction.

9. The system according to claim 8, wherein the processor is further configured to execute the instructions to:
obtain, from a second capacitive sensor, a second value associated with a second capacitive field, wherein the second capacitive field intersects the first capacitive field; and
determine the intended vehicle use based on the first value and the second value.

10. The system according to claim 9, wherein the processor is further configured to execute the instructions to:
determine that a key fob has coterminous operation with the capacitive field within a threshold distance from the vehicle; and
provide the access to the vehicle based on determining that the key fob has coterminous operation with the capacitive field within the threshold distance.

11. The system according to claim 10, wherein the processor is further configured to execute the instructions to:
enable, via a wakeup signal, a third sensor;
obtain a third value indicative of the person approaching the vehicle; and
determine the intended vehicle use based on the first value, the second value, and the third value.

12. The system according to claim 10, wherein the key fob is a Phone-as-a-Key (PaaK) device.

13. The system according to claim 8, wherein the processor is further configured to execute the instructions to:
trigger a mitigating vehicle action comprising one or more of:
sounding an alarm;
triggering an image sensor to obtain an image of the person;
generating an instruction for disabling a vehicle function via an Electronic Control Unit (ECU); and
transmitting an alarm message to a mobile device.

14. The system according to claim 13, wherein the processor is further configured to execute the instructions to:
determine a movement of the person with respect to time;
determine a trajectory of the movement of the person with respect to the vehicle;
compare the movement of the person and the trajectory of the person to a table indicative of vehicle usage; and
select the intended vehicle use for the person from the table indicative of vehicle usage.

15. A non-transitory computer-readable storage medium in a vehicle computer, the computer-readable storage medium having instructions stored thereupon which, when executed by a processor, cause the processor to:
determine a vehicle drive state of a vehicle;
select a capacitive field scan rate based on the vehicle drive state;
obtain, from a first capacitive sensor, a first value associated with a first capacitive field;
determine, using the selected capacitive field scan rate, that a person approaches the vehicle;
determine, using the first value associated with the first capacitive field, an intended vehicle use for the person;
generate a processor initialization instruction responsive to the intended vehicle use; and
provide access to the vehicle based on the processor initialization instruction.

16. The non-transitory computer-readable storage medium according to claim 15, wherein the processor is further configured to execute the instructions to:
obtain, from a second capacitive sensor, a second value associated with a second capacitive field, wherein the second capacitive field intersects the first capacitive field; and
determine the intended vehicle use based on the first value and the second value.

17. The non-transitory computer-readable storage medium according to claim 16, wherein the processor is further configured to execute the instructions to:

determine that a key fob has coterminous operation with the capacitive field within a threshold distance from the vehicle; and provide the access to the vehicle based on determining that the key fob has coterminous operation with the capacitive field within the threshold distance.

18. The non-transitory computer-readable storage medium according to claim 17, wherein the processor is further configured to execute the instructions to:

enable, via a wakeup signal, a third sensor;

obtain a third value indicative of the person approaching the vehicle; and determine the intended vehicle use based on the first value, the second value, and the third value.

19. The non-transitory computer-readable storage medium according to claim 17, wherein the key fob is a Phone-as-a-Key (PaaK) device.

20. The non-transitory computer-readable storage medium according to claim 15, wherein the processor is further configured to execute the instructions to:

trigger a mitigating vehicle action comprising one or more of:

sounding an alarm;

triggering an image sensor to obtain an image of the person;

generating an instruction for disabling a vehicle function via an Electronic Control Unit (ECU); and transmitting an alarm message to a mobile device.

\* \* \* \* \*